United States Patent
Thakkar et al.

(10) Patent No.: US 10,264,480 B2
(45) Date of Patent: *Apr. 16, 2019

(54) IDENTIFYING VOLTE TO DIFFERENT TECHNOLOGY TYPES

(71) Applicant: Verizon Patent and Licensing Inc., Arlington, VA (US)

(72) Inventors: Gunjan Thakkar, McKinney, TX (US); Hilda E. Sierra, Keller, TX (US); Parry Cornell Booker, Arlington, TX (US)

(73) Assignee: Verizon Patent and Licensing I nc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/956,293

(22) Filed: Apr. 18, 2018

(65) Prior Publication Data

US 2018/0242180 A1    Aug. 23, 2018

Related U.S. Application Data

(63) Continuation of application No. 15/146,415, filed on May 4, 2016, now Pat. No. 9,980,166.

(51) Int. Cl.
*H04W 24/08* (2009.01)
*H04L 29/06* (2006.01)

(52) U.S. Cl.
CPC .......... *H04W 24/08* (2013.01); *H04L 65/104* (2013.01); *H04L 65/1006* (2013.01)

(58) Field of Classification Search
CPC .... H04L 65/1006; H04W 28/06; H04W 24/08
See application file for complete search history.

(56) References Cited

U.S. PATENT DOCUMENTS

| 8,438,627 | B1 | 5/2013 | Hirschman et al. |
| 2014/0334618 | A1 | 11/2014 | Tang et al. |
| 2016/0156676 | A1 | 6/2016 | Verin et al. |

*Primary Examiner* — Paul H Masur

(57) ABSTRACT

A computer device may include a memory configured to store instructions and a processor configured to execute the instructions to detect a Session Initiation Protocol (SIP) call and identify an available technology type to carry the SIP call from an originating device. The processor may be further configured to execute the instructions to generate an originating available technology type header that includes information identifying the identified available technology type to carry the SIP call from the originating device and forward the SIP call toward a destination with the generated originating available technology type header.

20 Claims, 11 Drawing Sheets

```
Session Initiation Protocol (INVITE)
Request-Line: INVITE tel: 9824444444; phone-context=vzims.com SIP/2.0
Message Header
  Max-Forwards: 70
  Route <sip:9824444444@162.8.17.24>
  Via: SIP/2.0/UDP 162.8.17.24:5060;branch=z8jG3bK35ce16334f89
  Call-ID: 0848c27e8-2ceb86f4@162.7.26.13
  Cseq: 1 INVITE
  From: <ssip:9824444444@162.8.17.24>;tag=544670848c280f-1dda28a6
  To: <sip:8557777777@162.4.52.130; phone-context=vzims.com>
  Date: Mon, 19 Apr 2016 05:47:18 GMT
  Allow: INVITE, BYE, CANCEL, ACK, PRACK, UPDATE, INFO, REFER, NOTIFY, MESSAGE, OPTIONS
  P-Preferred Identity: <sip:+9821234567@vzims.com>
  P-Access-Network-Info: 3GPP-E-UTRAN-FDD; utran-cell-id-3gpp=687450
  Accept-Contact: *;+g.3gpp.icsi-ref="urn%3Aurn-7%3A3gpp-service.ims.icsi.mmtel"
  Supported: 100rel, times
  Min-SE: 300
  Session-Expires: 300
  User-Agent:706945
  Content-Length: 593
  Content-Type: application/sdp
  Originating-Available-Technology-Type: VoLTE        ~610
  Originating-Selected-Technology-Type: CDMA          ~620
Message Body
  ...
```

IDENTIFYING VOLTE TO DIFFERENT TECHNOLOGY TYPES

CROSS REFERENCE TO RELATED APPLICATIONS

This application is a continuation of U.S. patent application Ser. No. 15/146,415 filed on May 4, 2016, the contents of which are hereby incorporated herein by reference in their entirety.

BACKGROUND INFORMATION

Wireless communication networks continue to evolve. A provider of wireless communication services may have to work with multiple wireless access networks. Different access networks (including home and roaming networks) may be configured with different capabilities. As an example, some wireless access networks may evolve to newer technologies and legacy service may not be available. As another example, a service provider may start a new service in a geographical area, but may not offer a legacy service. Thus, the provider of wireless communication services may need to manage different types of wireless access networks in order to provide users with the best service possible in a specific network configuration.

BRIEF DESCRIPTION OF THE DRAWINGS

FIG. 6 is a diagram illustrating exemplary components of a SIP message according in an implementation described herein;

DETAILED DESCRIPTION OF PREFERRED EMBODIMENTS

Figure 1:
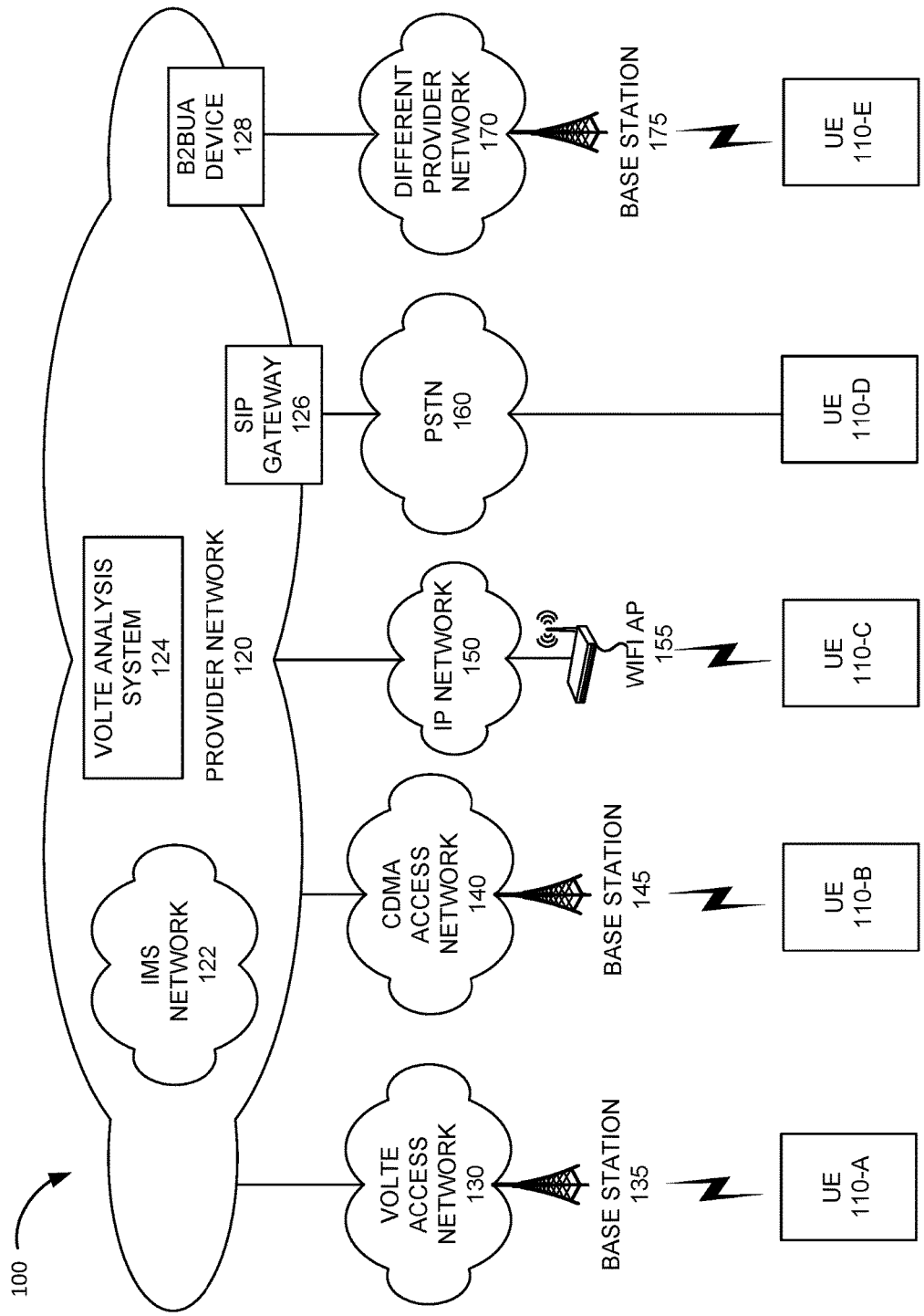
FIG. 1 is a diagram illustrating an environment according to an implementation described herein.

The following detailed description refers to the accompanying drawings. The same reference numbers in different drawings identify the same or similar elements.

A provider of wireless communication services may manage Long Term Evolution (LTE) wireless access networks (e.g., evolved packet core (EPC) networks) based on the LTE standard specified by the $3^{rd}$ Generation Partnership Project (3GPP). An LTE wireless access network may include Voice over LTE (VoLTE) functionality. A VoLTE network or service may deliver voice service as data flows within an LTE data bearer. In other words, a VoLTE service provides a packet-switched connection for voice communications. Thus, a VoLTE enabled access network may not need to make use of legacy circuit-switched voice networks.

Because VoLTE is a relatively new service, many wireless communication devices (e.g., mobile phones, tablets, Machine-Type Communication (MTC) fixed wireless devices, etc.) may not be enabled for VoLTE, may be in an area where VoLTE is not available, or may not be able to take advantage of existing VoLTE service for various reasons. Furthermore, devices may use other technology types to connect to a provider network. A provider of communication services may need to monitor technology types used to connect to a provider network and/or used to establish voice communication sessions, such as Session Initiation Protocol (SIP) calls. As an example, the provider of communication services may need to determine whether a particular service area needs to be targeted for upgrade for VoLTE service. As another example, the provider of communication services may need to detect that VoLTE is not being used in a particular service area, or by particular subscribers or types of subscribers, even though VoLTE is available.

Implementations described herein relate to identifying VoLTE calls to different technology types. Headers may be added to SIP messages (e.g., a SIP INVITE message, a SIP ACK message, a SIP 200-OK message, etc.) to identify available and/or selected technology types. For example, a first header may be added to identify an available originating technology type, a second header may be added to identify a selected originating technology type, a third header may be added to identify an available terminating technology type, and/or a fourth header may be added to identify a selected terminating technology type. In some implementations, the headers may correspond to Private-Communication (P-COM) headers. In other implementations, the headers may correspond to a different type of SIP header.

The phrase "technology type" may refer to whether a communication device is connected to a provider network via a wired connection or via a wireless connection; may refer to a type of wireless connection, such as a type of wireless access network and/or whether voice communications are carried using a VoLTE connection or a Code Division Multiple Access (CDMA) connection; may refer to a type of available CDMA connection (e.g., 1×RTT, Evolution-Data Optimized (EV-DO), enhanced High Rate Packet Data (eHRPD), etc.); may refer to whether the communication device is connected using a base station or using a short-range wireless communication method, such as WiFi; may refer to a type of wired connection, such as whether the communication device is connected using an Internet Protocol (IP) connection or whether the communication device is connected using the Public Switched Telephone Network (PSTN); and/or may refer to a different type of connection between the communication device and a provider network. For example, in some implementations, the technology type may be identified as VoLTE, CDMA, WiFi, PSTN, and/or another technology type. The phrase "originating technology type" may refer to a type of connection between a calling device originating, placing, or initiating a SIP call and a provider network. The phrase "terminating technology type" may refer to a type of connection between a called device terminating or receiving a SIP call and the provider network.

A computer device may detect a SIP call, may identify an available technology type to carry the SIP call from an originating device, may generate an originating available technology type header that includes information identifying the identified available technology type to carry the SIP call from the originating device, and forward the SIP call toward a destination with the generated originating available technology type header. A technology type may be described as "carrying" a SIP call if the technology type, along with associated protocols and standards, is used to establish and maintain a SIP communication session. If multiple technology types are available, in some implementations, a particular technology type may be designated as the "best" available technology type and indicated as the available technology type. As an example, if CDMA and VoLTE technology types are available, VoLTE may be designated as the available technology type. In other implementations, multiple available technology types may be identified and included in the originating available technology type header.

Furthermore, in some situations, a different technology type may be selected than an identified available technology type. As an example, VoLTE may be available to a wireless communication device and yet the wireless communication device may select CDMA for voice communications (e.g., to carry a SIP call). Thus, the computer device may identify a selected technology type to carry the SIP call from an originating device, may generate an originating selected available technology type header that includes information identifying the originating selected technology type to carry the SIP call from the originating device, and forward the SIP call toward a destination with the generated originating selected technology type header.

Moreover, the computer device may identify an available technology type to carry a SIP call to a terminating device, generate a terminating available technology type header that includes information identifying the identified available technology type to carry the SIP call to the terminating device, and process the SIP call with the generated terminating available technology type header.

The computer device may further identify a selected technology type to carry the SIP call to the terminating device, generate a terminating selected available technology type header that includes information identifying the terminating selected technology type to carry the SIP call from the originating device, and process the SIP call with the generated terminating selected technology type header.

In some situations, the computer device may correspond to the communication device originating or terminating the SIP call. As an example, a calling mobile phone may identify an available and/or selected technology type for the calling mobile phone and may include an originating technology type header in a SIP INVITE message when initiating a SIP call. As another example, a called mobile phone may identify an available and/or selected technology type for the called mobile phone and may include a terminating technology type header in a SIP 200 OK message when responding to a SIP INVITE message.

In other situations, the computer device may correspond to a SIP gateway. For example, calls originating in the PSTN or terminating in the PSTN may pass through a SIP gateway that converts SIP messages to time division multiplexing (TDM) signals, such as Signalling System 7 (SS7) signals. The SIP gateway may act as a SIP user agent (UA) and may add an originating or terminating technology type header to SIP messages.

In yet other situations, the computer device may correspond to a SIP back-to-back user agent (B2BUA). A B2BUA may function as a communication endpoint for SIP messages within a SIP network and may interface with another SIP network. If an originating or terminating device does not have the capability to identify its technology type, the B2BUA may add a technology type header when receiving a SIP INVITE message from an originating device and/or when receiving a SIP 200 OK message from a terminating device. Furthermore, a SIP call may originate or terminate in a different provider network. The different provider network may not provision or configure communication devices to add headers that identify a technology type. Thus, the B2BUA device may maintain a provider network database (DB) that may associate technology types with different provider network or different destinations in a particular provider network. The B2BUA device may determine that a SIP call originated from, or is terminating in, a different provider network and may access the provider network DB to determine the technology type associated with the SIP call originated from, or is terminating in, the different provider network, and may add a technology type header to the SIP call.

Implementations described herein may further relate to using the information included in a technology type header in a SIP call. For example, a VoLTE analysis system may collect and store information relating to SIP calls from one or more devices in a provider network, such as from a Call Session Control Function (CSCF) device, in an IP Multimedia Subsystem (IMS) network of the provider network, which processes SIP calls in the provider network. The VoLTE analysis system may retrieve the stored information relating to the SIP calls and may, based on the technology type headers included in the SIP calls, determine a number of SIP calls for particular technology types.

For example, the VoLTE analysis system may determine a number of VoLTE to VoLTE calls within a particular time period, the number of VoLTE to CDMA calls within the particular time period, the number of CDMA to VoLTE calls within the particular time period, the number of VoLTE to WiFi calls within the particular time period, the number of WiFi to VoLTE calls within the particular time period, the number of VoLTE to PSTN calls within the particular time period, the number of PSTN to VoLTE calls within the particular time period, the number of VoLTE calls to a particular different provider network within the particular time period, and/or the number of VoLTE calls received from a particular different provider network within the particular time period.

Furthermore, the VoLTE analysis system may calculate, for a particular service area, a number of SIP calls with a selected technology type that is different than an available technology type, determine that the calculated number of SIP calls with the selected technology type that is different than the available technology type is greater than a threshold, and generate a service alarm, in response to determining that the calculated number of SIP calls with the selected technology type that is different than the available technology type is greater than the threshold. Moreover, the VoLTE analysis system may determine one or more key performance indicators (KPIs) for a particular technology types and/or types of SIP calls, such as a call set up rate, a call drop rate, a call complete rate, a handover rate, a resource block utilization rate, a cell and/or base station traffic volume, a call latency rate, a throughput rate, and/or a different KPI. Furthermore, the VoLTE analysis system may determine particular technology types used by particular subscribers or by particular classes of subscribers.

FIG. 1 is a diagram of an exemplary environment 100 in which the systems and/or methods, described herein, may be implemented. As shown in FIG. 1, environment 100 may include user equipment (UE) devices 110-A to 110-E (referred to herein collectively as "UE devices 110" and individually as "UE device 110"), a provider network 120, a VoLTE access network 130, a CDMA access network 140, an IP network 150, a PSTN 160, and a different provider network 170. While FIG. 1 shows a single IMS network 122, a single VoLTE analysis system 124, a single VoLTE access network 130, a single CDMA access network 140, a single IP network 150, and a single different provider network 170 for illustrative purposes, in practice, environment 100 may include multiple IMS networks 122, multiple VoLTE analysis systems 124, multiple VoLTE access networks 130, multiple CDMA access networks 140, multiple IP networks 150, and/or multiple different provider networks 170.

UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities. In some implementations (e.g., UE device 110-D), UE device 110 may include a telephone terminal connected to PSTN 160 or to an IP network using a wired connection.

In some implementations, UE device 110 may correspond to an embedded wireless device that communicates wirelessly with other devices over a machine-to-machine interface. For example, UE device 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, a parking meter, etc.), and/or another type of electronic device.

Provider network 120 may include a SIP network managed by a provider of communication services. Provider network 120 may interface with VoLTE access network 130, CDMA access network 140, IP network 150, PSTN 160, and/or different provider network 170 to communicate with each other. Provider network 120 may include one or more circuit-switched networks and/or packet-switched networks that include a local area network (LAN), a wide area network (WAN), a metropolitan area network (MAN), an ad hoc network, an intranet, the Internet, a fiber optic-based network, a wireless network, and/or any combination of these or other types of networks. Provider network 120 may include an IMS network 122, VoLTE analysis system 124, SIP gateway 126, and B2BUA device 128.

IMS network 122 may include a network for delivering IP multimedia services as specified by 3GPP or other standards/protocols and may provide media flows between UE devices 110 and external IP networks or external circuit-switched networks (e.g., VoLTE access network 130, CDMA access network 140, IP network 150, PSTN 160, and/or different provider network 170). IMS network 122 may route and otherwise process SIP calls for provider network 120. For example, SIP INVITE messages may be sent by a calling UE device 110 to IMS network 122 and may be forwarded by IMS network 122 to a called UE device 110. SIP OK 200 messages may be sent by the called UE device 110 to IMS network 122 and forwarded to the calling UE device 110.

VoLTE analysis system 124 may collect SIP call data from UE devices 110, IMS network 122, SIP gateway, and/or B2BUA device 128. For example, VoLTE analysis system 124 may collect SIP call information including technology type header information, store the collected information, and perform analysis on the stored information. For example, VoLTE analysis system 124 may determine the number of calls for particular technology types, determine a KPI for calls associated with particular technology types, and/or determine whether a number of SIP calls with a selected technology type that is different than an available technology type is greater than a threshold for a particular time period and/or service area.

SIP gateway 126 may interface a SIP network in provider network 120 with PSTN 160. For example, SIP gateway 126 may terminate a SIP call signal, generate time division multiplexing (TDM) signals, such as Signaling System No. 7 (SS7) signals, based on the SIP call signal, and provide the TDM signals to PSTN 160. Furthermore, SIP gateway 126 may receive TDM signals from PSTN 160 and generate a SIP signal based on the received TDM signals. SIP gateway 126 may add an originating or terminating technology type header to a SIP call indicating that the SIP call is associated with a PSTN technology type.

B2BUA device 128 may include any device configured as a SIP B2BUA device. A SIP B2BUA device may divide a SIP communication channel into two call segments, an incoming call segment and an outgoing call segment. A SIP B2BUA may include an answering user agent (UA) that receives SIP messages from another UA, an originating UA that generates SIP messages based on SIP messages received by the answering UA, and call control logic that processes SIP messages received by the answering UA. For example, the call control logic may perform authentication and authorization, add a diversion header to a SIP message, process a SIP message based on a particular call scenario script, and/or perform other processing in a SIP message. A B2BUA may be implemented, for example, by an Internet Protocol (IP) Private Branch Exchange (PBX), by a Session Border Controller (SBC), and/or by a SIP Application Server (AS). B2BUA device 128 may act as a user agent server for SIP calls originating from different provider network 170 and process the SIP calls as a user agent client with respect to provider network 120. Furthermore, B2BUA device 128 may act as a user agent server for SIP calls received via provider network 120 and process the SIP calls as a user agent client with respect to calls that terminate in different provider network 170. B2BUA device 128 may add an originating or terminating technology type header to a SIP call indicating that the SIP call is associated with a particular technology type. B2BUA device 128 may include a technology type DB that maintains information about particular technology types associated with different provider network 170 and may add an originating or terminating technology type header to a SIP call based on information stored in the technology type DB.

VoLTE access network 130 may provide wireless access to provider network 120 for UE device 110-A via VoLTE. VoLTE access network 130 may include a base station 135 and UE device 110-A may wirelessly communicate with VoLTE access network 130 via base station 135. VoLTE access network 130 may include a Long Term Evolution (LTE) access network (e.g., an evolved packet core (EPC) network) based on the LTE standard specified by the $3^{rd}$ Generation Partnership Project (3GPP).

CDMA access network 140 may provide wireless access to provider network 120 for UE device 110-B via CDMA. CDMA access network 140 may include a base station 145 and UE device 110-B may wirelessly communicate with CDMA access network 140 via base station 145. As an example, CDMA access network 140 may include a CDMA access network based on, for example, a CDMA2000 standard. In some implementations, the CDMA access network may include a CDMA enhanced High Rate Packet Data (eHRPD) network. As another example, CDMA access network 140 may include an older legacy CDMA access network, such as an EV-DO CDMA network or an 1×RTT CDMA network.

IP network 150 may include an IP network in communication with provider network 120. IP network 150 may include WiFi access point (AP) 155. WiFi AP 155 may provide short range wireless access to IP network 150 for UE 110-C using WiFi based on an Institute of Electrical and Electronics Engineers (IEEE) 802.11 standard. UE 110-C may connect directly to a SIP network in provider network 120 (e.g., to IMS network 122) via WiFi AP 155. PSTN 160 may include the PSTN and connect to provider network 120 via SIP gateway 126. UE 110-D may be connected to PSTN 160 via a wired connection.

Different provider network 170 may correspond to a provider network associated with a different provider of communication services (e.g., a different carrier) and may include a different SIP network. Different provider network 170 may connect to multiple wireless access networks (not shown in FIG. 1) associated with various technology types, such as VoLTE and/or CDMA. Furthermore, different provider network 170 may connect to various IP networks and may enable UE device 110-E to connect to different provider network 170 via WiFi APs and/or via PSTN 160.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
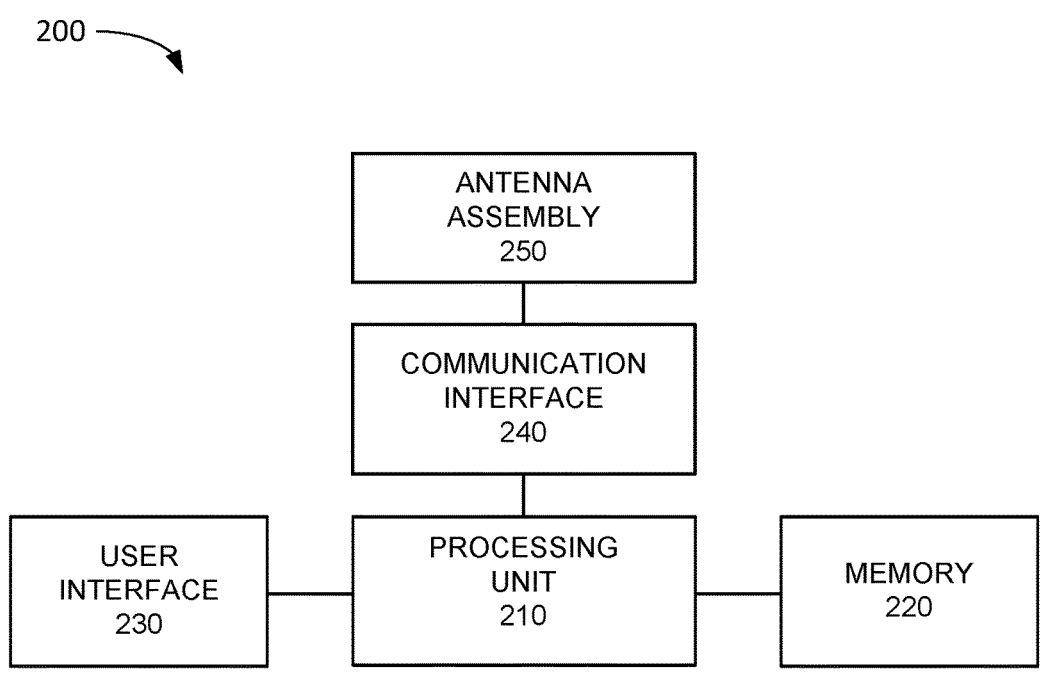
FIG. 2 is a diagram illustrating exemplary components of a device that may be included in one or more components of FIG. 1.

FIG. 2 is a diagram illustrating exemplary components of device 200 according to an implementation described herein. UE device 110, VoLTE analysis system 124, SIP gateway 126, and/or B2BUA device 128 may each include one or more devices 200. As shown in FIG. 2, device 200 may include a processing unit 210, a memory 220, a user interface 230, a communication interface 240, and an antenna assembly 250.

Processing unit 210 may include one or more single-core or multi-core processors, microprocessors, microcontrollers, application specific integrated circuits (ASICs), field programmable gate arrays (FPGAs), graphical processing units (GPUs), and/or other processing logic. Processing unit 210 may control operation of device 200 and its components.

Memory 220 may include any type of dynamic storage device that may store information and/or instructions, for execution by processing unit 210, and/or any type of non-volatile storage device that may store information for use by processing unit 210. For example, memory 220 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

User interface 230 may allow a user to input information to device 200 and/or to output information from device 200. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 200 to vibrate; and/or any other type of input or output device. In some implementations, device 200 may be managed remotely and may not include user interface 230. In other words, device 200 may be "headless" and may not include a display, for example.

Communication interface 240 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals and receive RF signals and provide them to communication interface 240. In some implementations, device 200 may be configured to communicate via wired connections and may not include antenna assembly 250. For example, if device 200 is included in UE device 110, device 200 may include antenna assembly 250. On the other hand, if device 200 is included in VoLTE analysis system 124, SIP gateway 126, and/or B2BUA device 128, device 200 may not include antenna assembly 250.

As described herein, device 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Additionally or alternatively, one or more components of device 200 may perform the tasks described as being performed by one or more other components of device 200.

Figure 3:
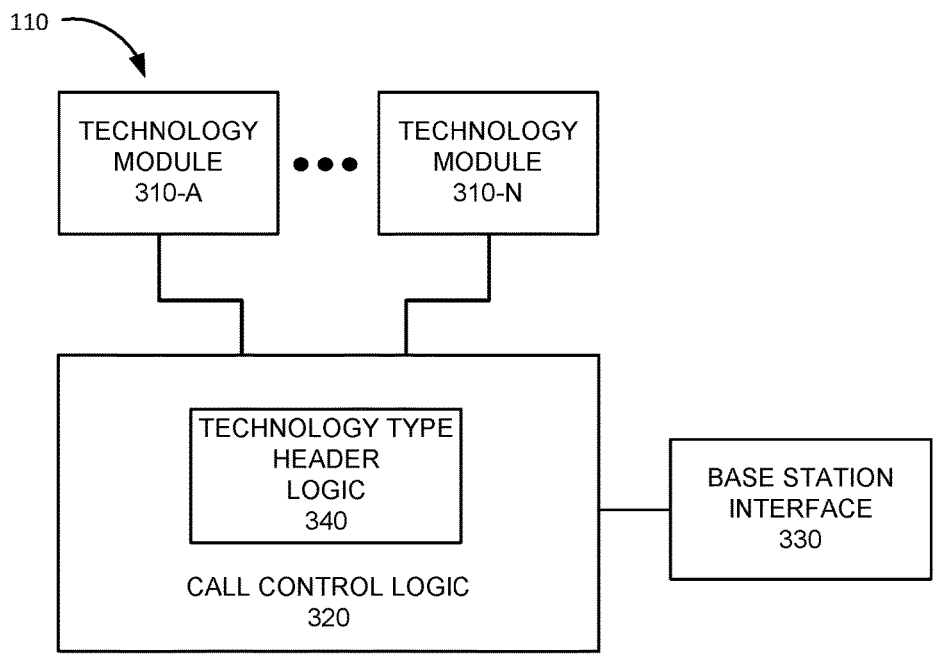
FIG. 3 is a diagram illustrating exemplary functional components of the user equipment (UE) device of FIG. 1.

FIG. 3 is a diagram illustrating exemplary functional components of UE device 110 according to an implementation described herein. The functional components of UE device 110 may be implemented, for example, via processing unit 210 executing instructions from memory 220. Alternatively, some or all of the functional components of UE device 110 may be implemented via hard-wired circuitry. As shown in FIG. 3, UE device 110 may include a one or more technology modules 310-A to 310-N (referred to herein individually as "technology module 310" and collectively as "technology modules 310"), a call control logic 320, and a base station interface 330.

Technology module 310 may correspond to a module configured to enable UE device 110 to communicate using a particular technology type. For example, technology module 310-A may correspond to a VoLTE chipset, technology module 310-B may correspond to a CDMA chipset, technology module 310-C may correspond to a WiFi chipset, etc. Each technology module 310 may provide information to call control logic 320 relating to whether a corresponding technology type is available. For example, a VoLTE technology module may provide information relating to whether VoLTE access network 130 is available based on signals detected from base station 135, a CDMA technology module may provide information relating to whether CDMA access network 140 is available based on signals detected from base station 145, a WiFi technology module may provide information relating to whether WiFi AP 155 is available, etc.

Call control logic 320 may control the origination, processing, and/or termination of SIP calls. Call control logic 320 may include a technology type header logic 340. Technology type header logic 340 may generate a technology type header based on information received from technology modules 310. As an example, technology type header logic 340 may generate an originating available technology type header and/or an originating selected technology type header for calls originating from UE device 110. As another example, technology type header logic 340 may generate a terminating available technology type header and/or a terminating selected technology type header for calls terminating to UE device 110.

Base station interface 330 may be configured to communicate with a base station (e.g., base station 135, base station 145, etc.). Base station interface 330 may send SIP messages from UE 110 to IMS network 122 and/or may receive SIP messages from IMS network 122.

Although FIG. 3 shows exemplary functional components of UE device 110, in other implementations, UE device 110 may include fewer functional components, different functional components, differently arranged functional components, or additional functional components than depicted in FIG. 3. Additionally or alternatively, one or more functional components of UE device 110 may perform functions described as being performed by one or more other functional components of UE device 110.

Figure 4:
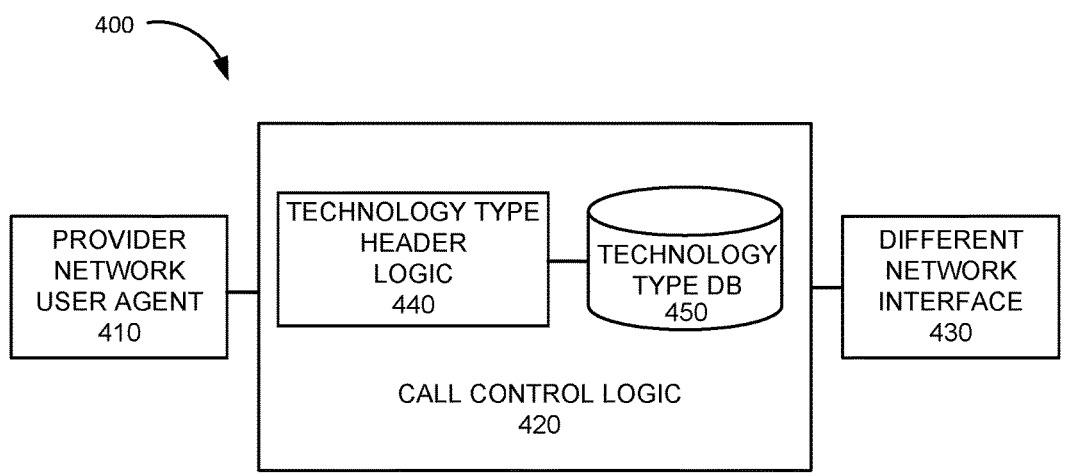
FIG. 4 is a diagram illustrating exemplary functional components of the back-to-back user agent (B2BUA) device or Session Initiation Protocol (SIP) gateway device of FIG. 1.

FIG. 4 is a diagram illustrating exemplary functional components of a device 400 according to an implementation described herein. SIP gateway 126 and/or B2BUA device 128 may each include one or more functional devices 400. The functional components of device 400 may be implemented, for example, via processing unit 210 executing instructions from memory 220. Alternatively, some or all of the functional components of device 400 may be implemented via hard-wired circuitry. As shown in FIG. 4, device 400 may include a provider network user agent 410, a call control logic 420, and a different network interface 430.

Provider network user agent 410 may function as a user agent server with respect to SIP calls received via another network (e.g., PSTN 160, different provider network 170, etc.) and may act as a user agent client with respect to calls outgoing to SIP devices from provider network 120 to the other networks.

Call control logic 420 may control the origination, processing, and/or termination of SIP calls. Call control logic 420 may include a technology type header logic 440 and a technology type DB 450.

Technology type header logic 440 may generate a technology type header based on information received from different network interface 430 and based on information stored in technology type DB 450. Technology type DB 450 may store information identifying technology types associated with the different networks reachable through different network interface 430.

Different network interface 430 may interface with the other network. As an example, if device 400 corresponds to SIP gateway 126, different network interface 430 may interface with PSTN 160 and may convert SIP calls to TDM signals and vice versa. As another example, if device 400 corresponds to B2BUA device 128, different network interface 430 may include a user agent that functions as a user agent server with respect to calls received from provider network 120 and may act as a user agent client with respect to SIP calls from different provider network 170.

If device 400 corresponds to SIP gateway 126, technology type DB 450 may identify all calls received via different network interface 430 as PSTN calls. If device 400 corresponds to B2BUA device 128, technology type DB 450 may associate different access networks with different technology types. In some implementations, the information stored in technology type DB 450 may be obtained from different provider network 170 via an agreement between provider network 120 and different provider network 170. A particular access network associated with a SIP call originating from or terminating in different provider network 170 may be identified based on, for example, an IP address, a SIP address, and/or other types of identifying information included in a SIP header of the SIP call.

Although FIG. 4 shows exemplary functional components of device 400, in other implementations, device 400 may include fewer functional components, different functional components, differently arranged functional components, or additional functional components than depicted in FIG. 4. Additionally or alternatively, one or more functional components of device 400 may perform functions described as being performed by one or more other functional components of device 400.

Figure 5A:
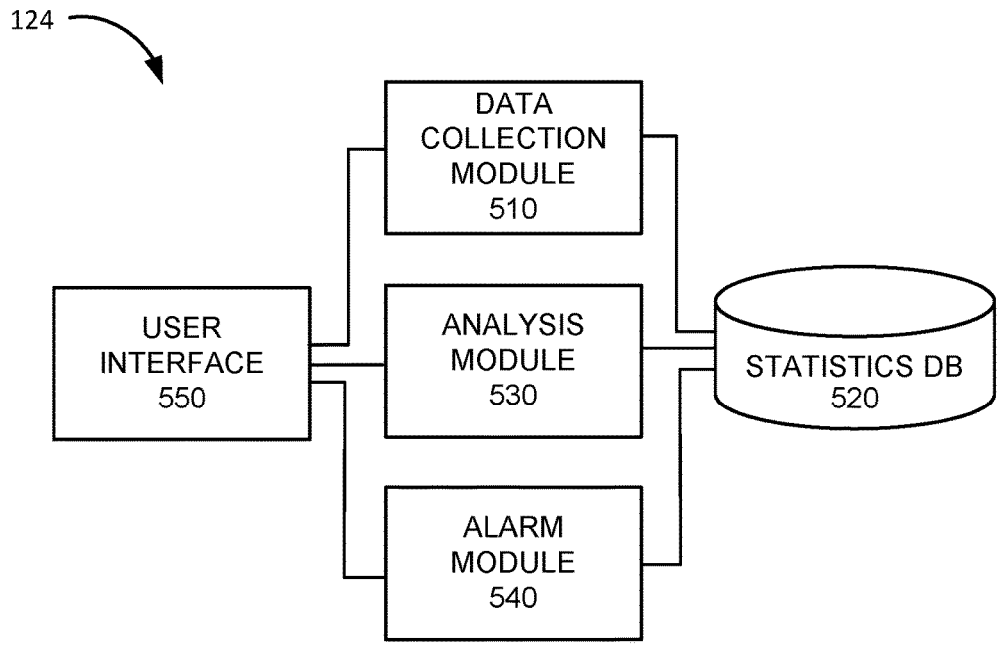
FIG. 5A is a diagram illustrating exemplary functional components of the Voice Over Long Term Evolution (VoLTE) analysis system of FIG. 1.

FIG. 5A is a diagram illustrating exemplary functional components of VoLTE analysis system 124 according to an implementation described herein. The functional components of VoLTE analysis system 124 may be implemented, for example, via processing unit 210 executing instructions from memory 220. Alternatively, some or all of the functional components of VoLTE analysis system 124 may be implemented via hard-wired circuitry. As shown in FIG. 5A, VoLTE analysis system 124 may include a data collection module 510, a statistics DB 520, an analysis module 530, an alarm module 540, and a user interface 550.

Data collection module 510 may collect SIP call data from UE devices 110, from IMS networks 122, from SIP gateways 126, and/or from B2BUA devices 128 and may store the collected SIP call data in statistics DB 520. Statistics DB 520 may store SIP call data and analysis data generated based on the SIP call data. Exemplary information that may be stored in statistics DB 520 is described below with reference to FIG. 5B.

Analysis module 530 may analyze the SIP call data stored in statistics DB 520. For example, analysis module 530 may determine the number of SIP calls for particular technology types; may calculate, for a particular service area, a number of SIP calls with a selected technology type that is different than an available technology type; determine one or more KPIs for a particular technology types and/or types of SIP calls; determine particular technology types used by particular subscribers or by particular classes of subscribers (e.g., minutes of use for a particular technology for a particular subscriber or type of subscriber); and/or perform other types of analysis.

Alarm module 540 may be configured to generate an alarm when a particular condition associated with SIP call data has been detected. For example, alarm module 540 may determine that a calculated number of SIP calls with a selected technology type that is different than an available technology type is greater than a threshold, and may generate a service alarm in response.

User interface 550 may be configured to provide information generated by data collection module 510, analysis module 530, and/or alarm module to an administrator. As an example, user interface 550 may display analysis results generated by analysis module 530 and/or stored in statistics DB 520 based on collected SIP call data that includes technology type headers. As another example, user interface 550 may display an alarm generated by alarm module 540 about a detected condition associated with the collected SIP call data that includes technology type headers.

Although FIG. 5A shows exemplary functional components of VoLTE analysis system 124, in other implementations, VoLTE analysis system 124 may include fewer functional components, different functional components, differently arranged functional components, or additional functional components than depicted in FIG. 5A. Additionally or alternatively, one or more functional components of VoLTE analysis system 124 may perform functions described as being performed by one or more other functional components of VoLTE analysis system 124.

Figure 5B:
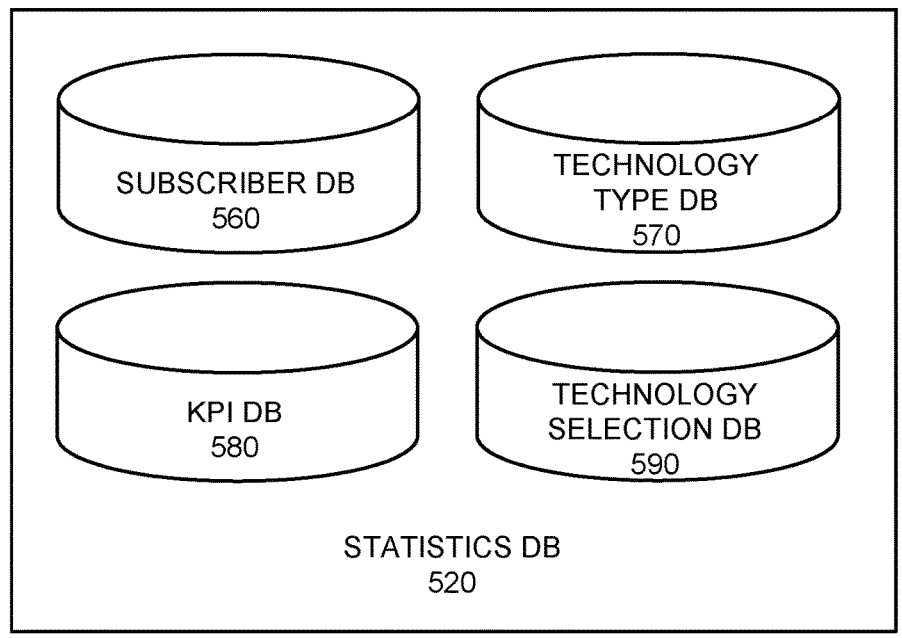
FIG. 5B is a diagram illustrating exemplary functional components of the statistics database of FIG. 5A.

FIG. 5B is a diagram illustrating exemplary components of statistics DB 520. As shown in FIG. 5B, statistics DB 520 may include a subscriber DB 560, a technology type DB 570, a KPI DB 580, and a technology selection DB 590.

Subscriber DB 560 may store information relating to particular subscribers. For example, subscriber DB 560 may store information relating to particular technology types used by particular subscribers and/or information relating to particular technology types used by particular types of subscribers (e.g., particular types of subscriptions, particular device models, particular service areas, etc.).

Technology type DB 570 may store information relating to the number of SIP calls between particular technology types within a particular time period that were processed by provider network 120. For example, technology type DB 570 may store information identifying the number of VoLTE to VoLTE calls within a particular time period, the number of VoLTE to CDMA calls within the particular time period, the number of CDMA to VoLTE calls within the particular time period, the number of VoLTE to WiFi calls within the particular time period, the number of WiFi to VoLTE calls within the particular time period, the number of VoLTE to PSTN calls within the particular time period, the number of PSTN to VoLTE calls within the particular time period, the number of VoLTE calls to a particular different provider network within the particular time period, and/or the number of VoLTE calls received from a particular different provider network within the particular time period.

KPI DB 580 may store KPIs for SIP calls between particular technology types. For example, for SIP calls between particular technology types, KPI DB 580 may store information, for SIP calls between two particular technology types relating to a call set up rate, a call drop rate, a call complete rate, a handover rate, a resource block utilization rate, a cell and/or base station traffic volume, a call latency rate, a throughput rate, and/or a different KPI.

Technology selection DB 590 may store information relating to which technology type was selected with respect to the available technology type for SIP calls. For example, technology selection DB 590 may store, for a particular service area, a number of SIP calls with a particular selected technology type that is different than a particular available technology type (e.g., a number of times CDMA access network 140 was selected even though VoLTE access network 130 was available).

Although FIG. 5B shows exemplary fields stored in statistics DB 520, in other implementations, statistics DB 520 may include fewer fields, different fields, differently arranged fields, or additional fields than depicted in FIG. 5B.

FIG. 6 is a diagram illustrating exemplary components of a SIP message 600 according to an implementation described herein. As shown in FIG. 6, SIP message 600 may correspond to a SIP INVITE message and may include an originating available technology type header 610 and an originating selected technology type header 620.

Originating available technology type header 610 may identify a best available originating technology type. Technology types may be ranked in preference and the available technology type with the highest ranked preference may be designated as the best available technology type. For example, if VoLTE is available, VoLTE may be designated as the best available technology type and included in originating available technology type header 610, as shown in the example of FIG. 6.

Originating selected available technology type header 620 may identify the technology type that was selected by the originating UE device 110 that initiated the SIP call. For example, if VoLTE was available and the originating UE device 110 selected CDMA access network 140 to connect to provider network (e.g., because the VoLTE signal had poor signal quality, because the VoLTE base station has exceeded capacity, because VoLTE capability in the originating UE device 110 was not activated, etc.), CDMA may be designated as the selected technology type and included in originating selected technology type header 620, as shown in the example of FIG. 6.

Although FIG. 6 shows exemplary fields stored in SIP message 600, in other implementations, SIP message 600 may include fewer fields, different fields, differently arranged fields, or additional fields than depicted in FIG. 6. For example, while FIG. 6 shows originating available technology type header 610 and originating selected technology type header 620 as separate headers, in other implementations, the information in originating available technology type header 610 and originating selected technology type header 620 may be included in a single header.

Figure 7:
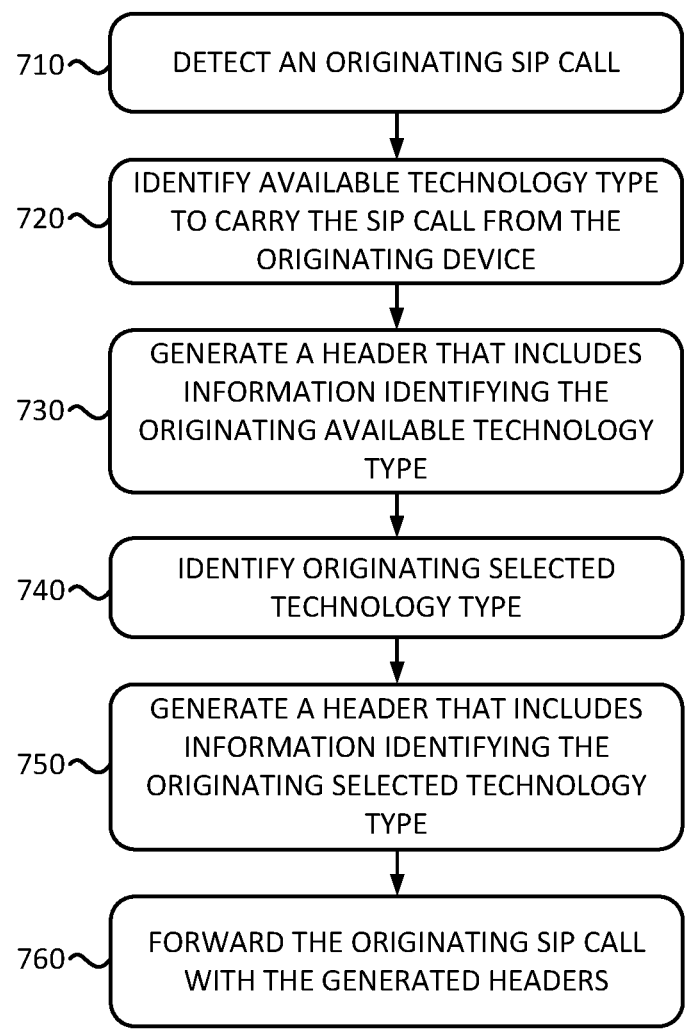
FIG. 7 is a flowchart of a first process for adding a technology type header according to an implementation described herein.

FIG. 7 is a flowchart of a first process for adding a technology type header according to an implementation described herein. In some implementations, the process of FIG. 7 may be performed by UE device 110. In other implementations, some or all of the process of FIG. 7 may be performed by another device or a group of devices separate from UE device 110. For example, some or all of the process of FIG. 7 may be performed by SIP gateway 126 or B2BUA device 128.

The process of FIG. 7 may include detecting an originating SIP call (block 710). As an example, UE device 110 may detect that a user, or an application running on UE device 110, has requested to initiate a SIP call to another UE device 110 or to an application server. As another example, B2BUA device 128 may receive a SIP call from different provider network 170. As yet another example, SIP gateway 126 may receive a PSTN call from PSTN network 160.

An available technology type to carry the SIP call from the originating device may be identified (block 720) and a header may be generated that includes the information identifying the originating available technology type (block 730). As an example, call control logic 320 may communicate with technology modules 310 to determine which technology types are available. For example, a VoLTE technology module 310-A may detect signals from a VoLTe base stations (e.g., base station 135) and a CDMA technology module 310-B may detect signals from a CDMA base stations (e.g., base station 145). Call control logic 320 may identify the best available technology type based on a specified ranking of technology types, select the best available technology type as the available technology type, and include the identified available technology type in the originating available technology type header. As another example, SIP gateway 126 may identify the available technology type as PSTN based on a call originating from PSTN 160. As yet another example, B2BUA device 128 may identify an available technology type based on one or more identifiers included in a received SIP INVITE and based on information stored in technology type DB 450.

A selected technology type to carry the SIP call from the originating device may be identified (block 740) and a header may be generated that includes the information identifying the originating selected technology type (block 750). As an example, call control logic 320 may select a particular technology type. A technology type different from a best available technology type may be selected to connect to provider network 120 and thus to carry SIP calls to provider network 120. As an example, VoLTE access network 130 may be available, but one or more quality metrics may be below a threshold (e.g., a signal strength, a throughput rate, an error rate, etc.) and a different access network may be selected (e.g., CDMA access network 140). As another example, UE device 110 may not have VoLTE capability or an existing VoLTE capability may not be activated. As yet another example, VoLTE access network 130 may reject a request from UE device 110 to attach because VoLTE access network 130 may be exceeding capacity. As another example, B2BUA device 128 may identify a selected technology type based on one or more identifiers included in a received SIP INVITE and based on information stored in technology type DB 450. In situations in which the process of FIG. 7 is performed by SIP gateway 126, the available and selected technology level may be the same and there may be no need to include both headers. Thus, a single originating technology type header may be used to identify the technology type as PSTN.

The originating SIP call may be forwarded with the generated headers (block 760). For example, the originating SIP call may be forwarded with an originating available technology type header and/or an originating selected technology type header toward a user agent associated with the destination of the SIP call.

Figure 8:
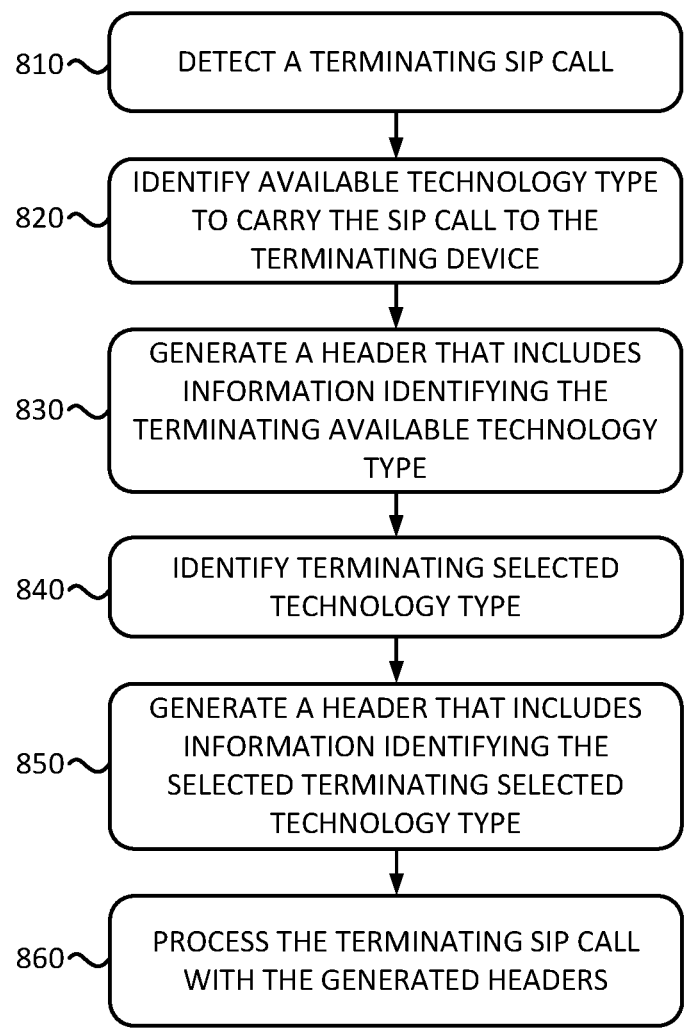
FIG. 8 is a flowchart of a second process for adding a technology type header according to an implementation described herein.

FIG. 8 is a flowchart of a second process for adding a technology type header according to an implementation described herein. In some implementations, the process of FIG. 8 may be performed by UE device 110. In other implementations, some or all of the process of FIG. 8 may be performed by another device or a group of devices separate from UE device 110. For example, some or all of the process of FIG. 8 may be performed by SIP gateway 126 or B2BUA device 128.

The process of FIG. 8 may include detecting a terminating SIP call (block 810). As an example, UE device 110 may receive a SIP call from another UE device 110. As another example, B2BUA device 128 may receive a SIP call from provider network 120 that is terminating in different provider network 170. As yet another example, SIP gateway 126 may receive a SIP call from provider network 120 that is terminating in PSTN network 160.

An available technology type to carry the SIP call to the terminating device may be identified (block 820) and a header may be generated that includes the information identifying the terminating available technology type (block 830). As an example, call control logic 320 may communicate with technology modules 310 to determine which technology types are available as explained above with reference to FIG. 7. As another example, SIP gateway 126 may identify the available technology type as PSTN based on a call terminating in PSTN 160. As yet another example, B2BUA device 128 may identify an available technology type based on one or more identifiers included in a received SIP 200 OK received from the responding terminating UE device 110 and based on information stored in technology type DB 450.

A selected technology type to carry the SIP call from the terminating device may be identified (block 840) and a header may be generated that includes the information identifying the terminating selected technology type (block 850). As an example, call control logic 320 may select a particular technology type. A technology type different from a best available technology type may be selected to connect to provider network 120 and thus to carry SIP calls from provider network 120 as explained above with reference to FIG. 7. As another example, B2BUA device 128 may identify a selected technology type based on one or more identifiers included in a received SIP 200 OK message and based on information stored in technology type DB 450. In situations in which the process of FIG. 8 is performed by SIP gateway 126, the available and selected technology level may be the same and there may be no need to include both headers. Thus, a single terminating technology type header may be used to identify the technology type as PSTN.

The terminating SIP call may be processed with the generated headers (block 860). For example, a responding SIP 200 OK message from the terminating UE device 110 may be forwarded toward the originating UE device 110 with a terminating available technology type header and/or a terminating selected technology type header toward a user agent associated with the destination of the SIP call.

Figure 9:
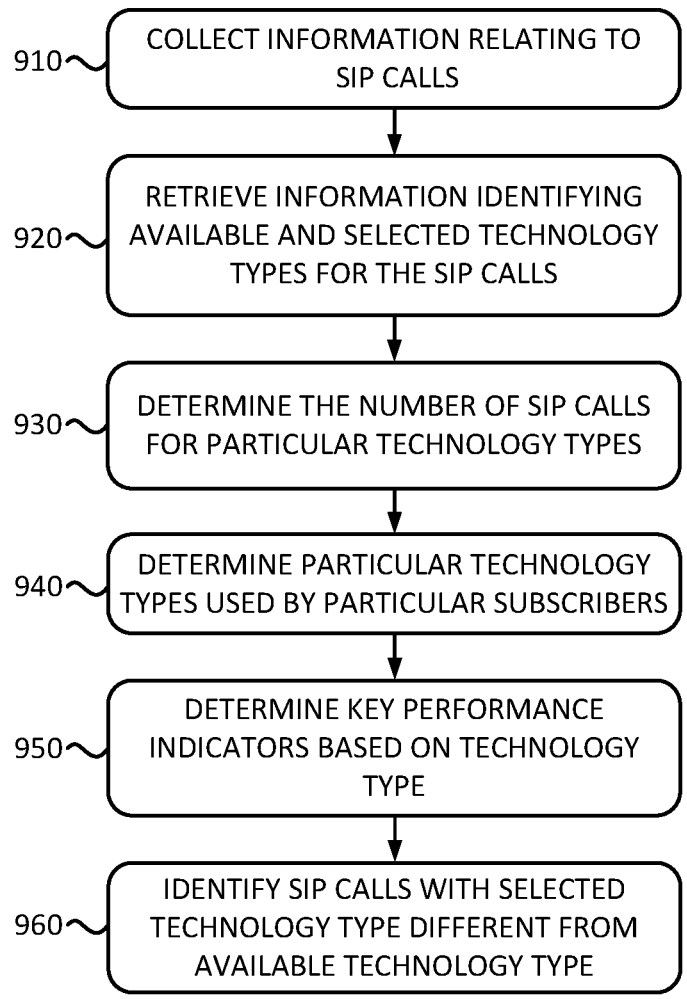
FIG. 9 is a flowchart of a process for using technology type information obtained from SIP headers according to an implementation described herein.

FIG. 9 is a flowchart of a process for using technology type information obtained from SIP headers according to an implementation described herein. In some implementations, the process of FIG. 9 may be performed by VoLTE analysis system 124. In other implementations, some or all of the process of FIG. 9 may be performed by another device or a group of devices separate from VoLTE analysis system 124.

The process of FIG. 9 may include collecting information relating to SIP calls (block 910). For example, VoLTE analysis system 124 may collect SIP call records stored by IMS network 122, SIP gateway 126, and/or B2BUA device 18 at particular intervals. In some implementations and with users' permissions, VoLTE analysis system 124 may collect SIP call records directly from UE devices 110.

Information identifying available and/or selected technology types for the SIP calls may be retrieved (block 920) and the number of SIP calls for particular technology types may be determined (block 930). For example, analysis module 530 may retrieve the identified technology types from originating available technology type headers, originating selected technology type headers, terminating available technology type headers, and/or terminating selected technology type headers of the collected SIP call records, may identify the number of SIP calls for particular pairs of technology types, and may store the information identifying the number of SIP calls for particular pairs of technology types in technology type DB 570.

Particular technology types used by particular subscribers may be determined (block 940). For example, analysis module 530 may identify particular subscribers and/or particular types of subscribers based on the collected SIP call records and may identify a frequency of occurrence of particular technology types and store the identified frequency of occurrence of particular technology types in subscriber DB 560. As an example, analysis module 530 may determine a ratio of VoLTE use versus CDMA use for a particular model of mobile phone. As another example, analysis module 530 may determine that subscribers in a particular service area never use WiFi for SIP calls. As another example, analysis module 530 may correlate minutes of use for each technology type for particular users or particular types of users.

KPIs based on technology types may be determined (block 950). For example, analysis module 530 may determine one or more KPIs for SIP calls between two particular technology types (e.g., VoLTE to VoLTE calls, VoLTE to CDMA calls, etc.), such as a call set up rate, a call drop rate, a call complete rate, a handover rate, a resource block utilization rate, a cell and/or base station traffic volume, a call latency rate, a throughput rate, and/or a different KPI. The KPI information may be used, for example, to determine whether particular KPIs are being driven by a particular call scenario (e.g., a particular originating technology type to a particular terminating technology type).

SIP calls for which a selected technology type is different from an available technology type may be identified (block 960). For example, analysis module 530 may identify SIP call records, for a particular service area, for which the selected technology type differs from the available technology type (e.g., a number of times CDMA access network was selected even though VoLTE access network was available). If the number of identified SIP calls for which the selected technology type differs from the available technology type is greater than a threshold, a problem in the particular service area may be indicated, and an alarm may be generated. The alarm may indicate to the provider that, for example, VoLTE service in the particular service area should be upgraded.

Figure 10:
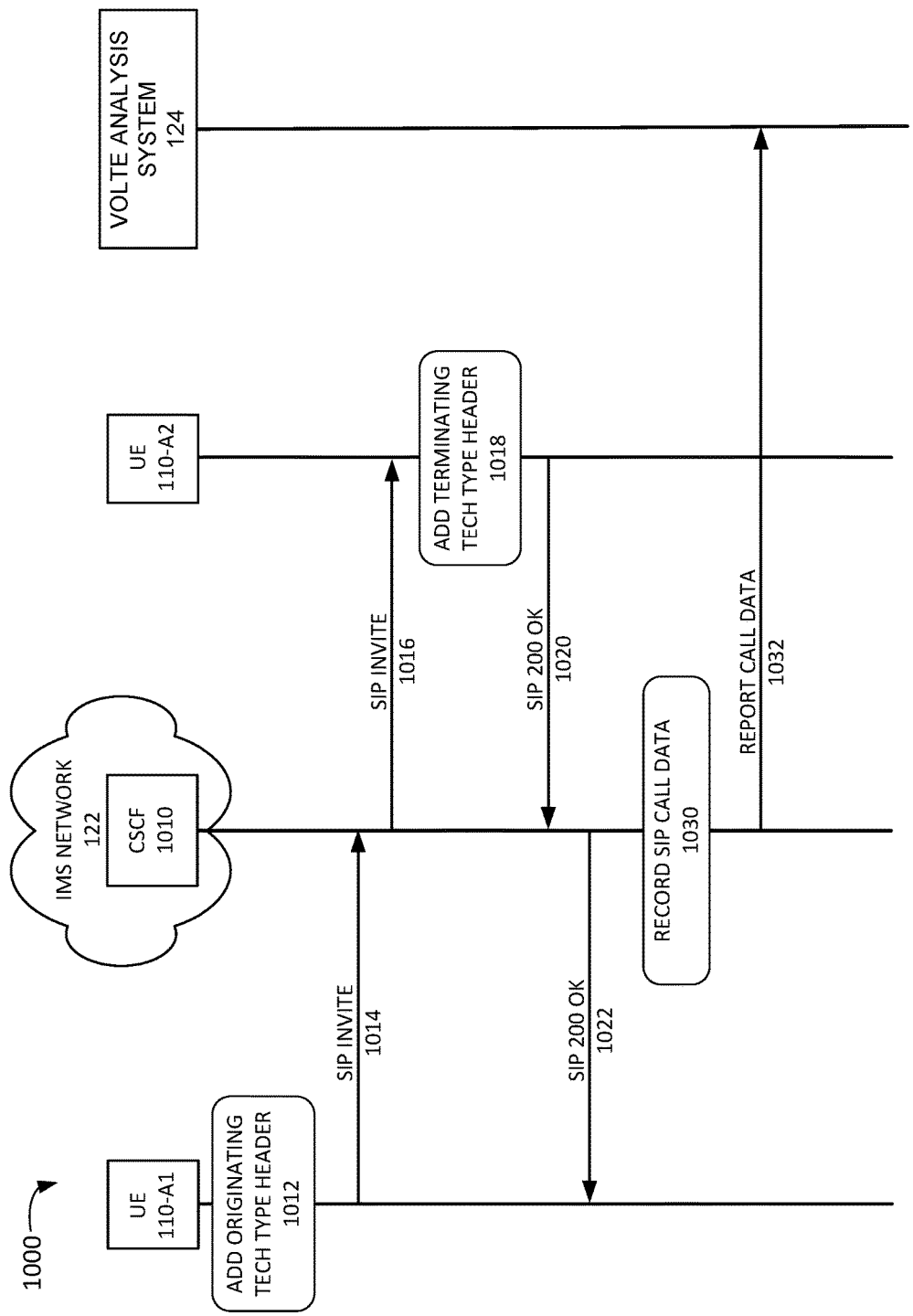
FIG. 10 is a diagram of a first exemplary signal flow according to an implementation described herein.

FIG. 10 is a diagram of a first exemplary signal flow 1000 according to an implementation described herein. Signal flow 1000 depicts a VoLTE to VoLTE call and assumes that the best available technology type was selected for both the originating and terminating device. Signal flow 1000 may include UE device 110-A1 originating a SIP call to UE device 110-A2. UE device 110-A1 may detect the availability of VoLTE access network 130, generate an originating technology type header, and add the generated originating technology type header to a SIP invite message (block 1012). UE device 110-A1 may then send the SIP INVITE message to UE device 110-A2 via a CSCF device 1010 of IMS network 122 (signal 1014). CSCF device 1010 in IMS network 122 may receive the SIP INVITE message and may forward the SIP INVITE message to UE device 110-A2 (signal 1016).

UE device 110-A2 may receive the SIP INVITE message and may generate a SIP 200 OK response indicating that the SIP INVITE message has been received. UE 110-A2 may detect the availability of VoLTE access network 130 and may generate a terminating technology type header and add the generated terminating technology type header to a SIP 200 OK message (block 1018). UE device 110-A2 may then send the SIP 200 OK message to UE device 110-A1 via CSCF device 1010 of IMS network 110 (signals 1020 and 1022). CSCF 1010 may record the SIP call data, including the originating technology type header and the terminating technology type header (block 1030), and may report the SIP call data to VoLTE analysis system 124 (signal 1032).

Figure 11:
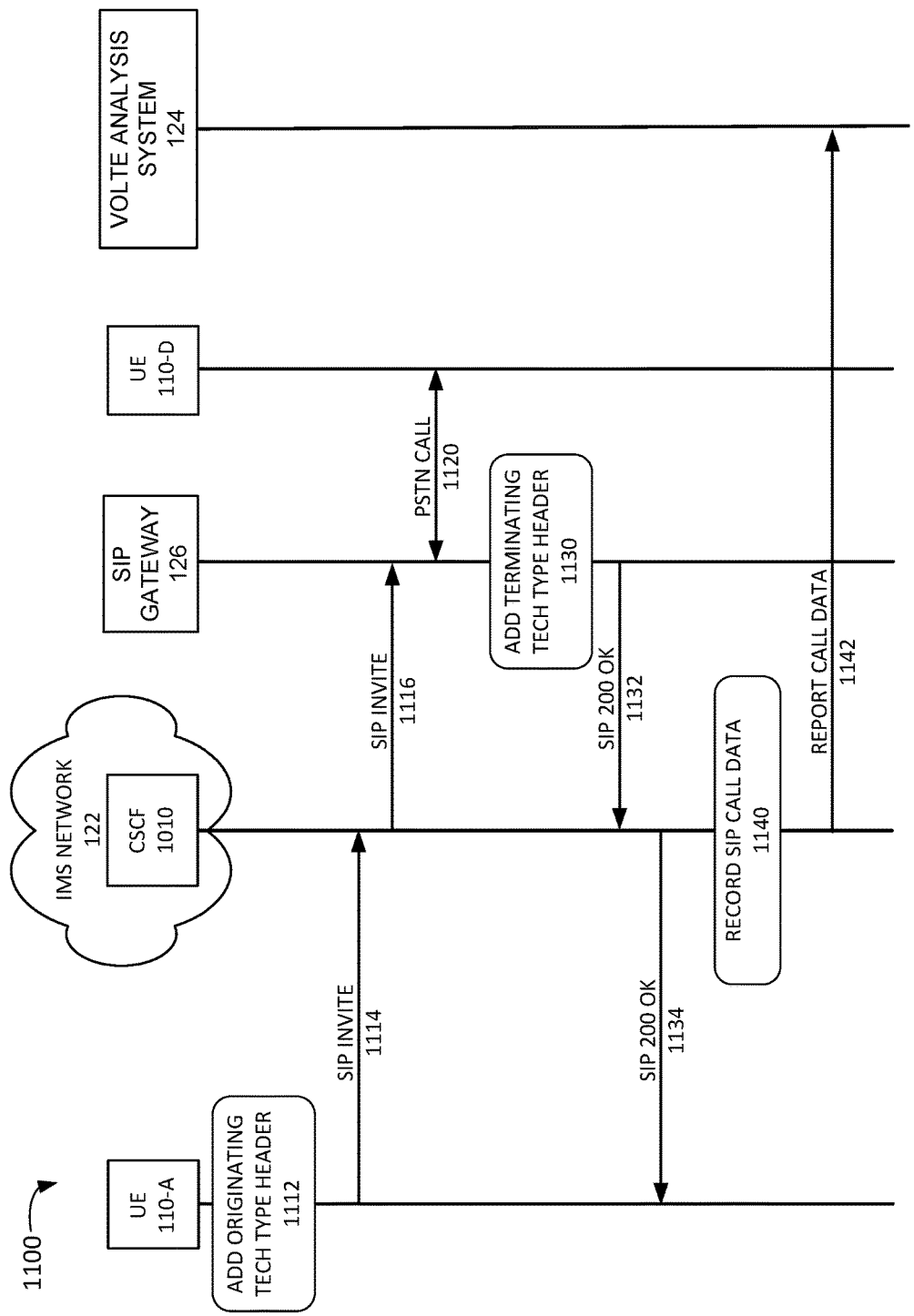
FIG. 11 is a diagram of a second exemplary signal flow according to an implementation described herein.

FIG. 11 is a diagram of a second exemplary signal flow 1100 according to an implementation described herein. Signal flow 1100 depicts a VoLTE to PSTN call and assumes that the best available technology type was selected for both the originating and terminating device. Signal flow 1100 may include UE device 110-A originating a SIP call to UE device 110-D. UE device 110-A may detect the availability of VoLTE access network 130, generate an originating technology type header, and add the generated originating technology type header to a SIP invite message (block 1112). UE device 110-A may then send the SIP INVITE message to UE device 110-D via CSCF device 1010 of IMS network 122 (signal 1114). CSCF device 1010 in IMS network 122 may receive the SIP INVITE message, determine that the intended destination of the SIP INVITE message is reachable via SIP gateway 126, and forward the SIP INVITE message to SIP gateway 126 (signal 1116).

SIP gateway 126 may initiate a PSTN call and may set up a connection with UE 110-D via PSTN 160 (signal 1120). UE 110-D may answer the call and respond to SIP gateway 126. SIP gateway 126 may generate a terminating technology type header to identify the terminating technology type as PSTN, add the generated terminating technology type header to a SIP 200 OK message (block 1130), and send the SIP 200 OK message to UE device 110-A via CSCF device 1010 (signals 1132 and 1134). CSCF 1010 may record the SIP call data, including the originating technology type header and the terminating technology type header (block 1140), and may report the SIP call data to VoLTE analysis system 124 (signal 1142).

Figure 12:
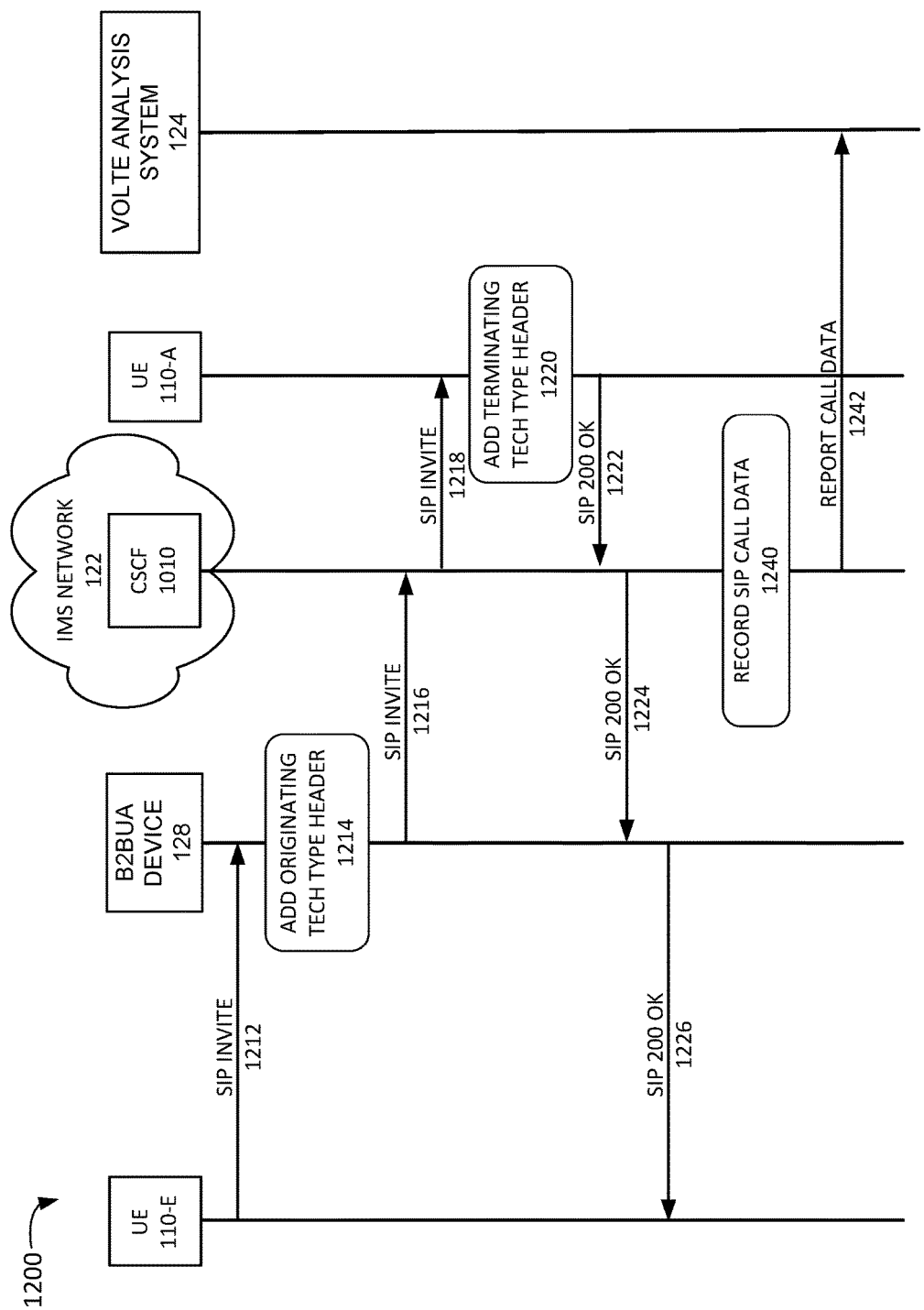
FIG. 12 is a diagram of a third exemplary signal flow according to an implementation described herein.

FIG. 12 is a diagram of a third exemplary signal flow 1200 according to an implementation described herein. Signal flow 1200 depicts a CDMA call from a different provider network to a VoLTE call and assumes that the best available technology type was selected for both the originating and terminating device. Signal flow 1200 may include UE 110-E originating a SIP call to UE device 110-A. UE device 110-E may not be configured to add an originating technology header to a SIP call. UE device 110-E may determine that UE device 110-A is reachable via B2BUA device 128 and may send a SIP INVITE message to B2BUA device 128 (signal 1212). B2BUA device 128 may access technology type DB 450 to identify a technology type associated with UE device 110-E. For example, technology type DB 450 may store information identifying technology types for particular access networks associated with different provider network 170. Assume B2BUA device 128 identifies an access network (e.g., based on an IP address included in the received SIP INVITE message) as a CDMA access network. B2BUA device 128 may then generate an originating technology type header identifying the technology type as CDMA and add the generated originating technology type header to a SIP invite message (block 1214). B2BUA device 128 may then send the SIP INVITE message to UE device 110-A via a CSCF device 1010 of IMS network 122 (signal 1216). CSCF device 1010 in IMS network 122 may receive the SIP INVITE message and forward the SIP INVITE message to UE device 110-A (signal 1218).

UE device 110-A may receive the SIP INVITE message and generate a SIP 200 OK response indicating that the SIP INVITE message has been received. UE 110-A may detect the availability of VoLTE access network 130, generate a terminating technology type header, and add the generated terminating technology type header to a SIP 200 OK message (block 1220). UE device 110-A may then send the SIP 200 OK message to B2BUA device 128 via CSCF device 1010 of IMS network 122 (signals 1222 and 1224). B2BUA device 128 may forward the SIP 200 OK message to UE device 110-E (signal 1226). CSCF 1010 may further record the SIP call data, including the originating technology type header and the terminating technology type header (block 1240), and may report the SIP call data to VoLTE analysis system 124 (signal 1242).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7-9, and series of signal flows have been described with respect to FIGS. 10-12, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   detecting, by a computer device, a Session Initiation Protocol (SIP) call from an originating device, wherein the computer device includes a wireless communication device, a SIP gateway device, or a back-to-back user agent (B2BUA) device;
   identifying, by the computer device, an available technology type to carry the SIP call from the originating device; and
   incorporating, by the computer device, information identifying the identified available technology type into the SIP call, before the SIP call is forwarded toward a destination.

2. The method of claim 1, wherein the computer device includes the wireless communication device.

3. The method of claim 1, wherein the computer device includes the SIP gateway device or the B2BUA device.

4. The method of claim 1, wherein the information identifying the identified available technology type to carry the SIP call from the originating device includes information identifying at least one of:
   a Voice over Long Term Evolution (VoLTE) access network;
   a Code Division Multiple Access (CDMA) access network;
   a WiFi access point; or
   a Public Switched Telephone Network (PSTN).

5. The method of claim 1, wherein identifying the available technology type to carry the SIP call from the originating device includes:
   determining that the SIP call originated from a provider network other than a provider network associated with the computer device; and
   accessing a provider network database to determine a technology type associated with the other provider network.

6. The method of claim 1, further comprising:
   identifying, by the computer device, a selected technology type to carry the SIP call from the originating device;
   generating, by the computer device, an originating selected technology type header that includes information identifying the originating selected technology type to carry the SIP call from the originating device; and
   forwarding the SIP call toward a destination with the generated originating selected technology type header.

7. The method of claim 1, further comprising:
   detecting, by the computer device, a terminating SIP call;
   identifying, by the computer device, an available technology type to carry the terminating SIP call to a terminating device;
   generating, by the computer device, a terminating available technology type header that includes information identifying the identified available technology type to carry the terminating SIP call to the terminating device; and
   processing the terminating SIP call with the generated terminating available technology type header.

8. The method of claim 7, wherein the available technology type to carry the terminating SIP call to the terminating device includes:
   a Voice over Long Term Evolution (VoLTE) access network;
   a Code Division Multiple Access (CDMA) access network;
   a WiFi access point; or
   a Public Switched Telephone Network (PSTN).

9. The method of claim 7, wherein identifying the available technology type to carry the terminating SIP call to the terminating device includes:
   determining that the SIP call is to terminate in a provider network other than a provider network associated with the computer device; and
   accessing a provider network database to determine a technology type associated with the other provider network.

10. The method of claim 7, further comprising:
    identifying, by the computer device, a selected technology type to carry the terminating SIP call to the terminating device;
    generating, by the computer device, a terminating selected technology type header that includes information identifying the terminating selected technology type to carry the terminating SIP call to the terminating device; and
    processing the SIP call with the generated terminating selected technology type header.

11. A computer device comprising:
    a memory configured to store instructions; and
    a processor configured to execute the instructions to:
        detect a Session Initiation Protocol (SIP) call from an originating device, wherein the computer device includes a wireless communication device, a SIP gateway device, or a back-to-back user agent (B2BUA) device;
        identify an available technology type to carry the SIP call from the originating device; and
        incorporate information identifying the identified available technology type into the SIP call, before the SIP call is forwarded toward a destination.

12. The computer device of claim 11, wherein the computer device includes the wireless communication device.

13. The computer device of claim 11, wherein the computer device includes the SIP gateway device or the B2BUA device.

14. The computer device of claim 11, wherein the processor is further configured to execute the instructions to:
    identify a selected technology type to carry the SIP call from the originating device;
    generate an originating selected technology type header that includes information identifying the originating selected technology type to carry the SIP call from the originating device; and
    forward the SIP call toward a destination with the generated originating selected technology type header.

15. The computer device of claim 11, wherein the processor is further configured to execute the instructions to:
    detect a terminating SIP call;
    identify an available technology type to carry the terminating SIP call to a terminating device;
    generate a terminating available technology type header that includes information identifying the identified available technology type to carry the terminating SIP call to the terminating device; and
    process the terminating SIP call with the generated terminating available technology type header.

16. The computer device of claim 15, wherein at least one of the available technology type to carry the terminating SIP call from the originating device or the available technology type to carry the terminating SIP call to the terminating device includes:

a Voice over Long Term Evolution (VoLTE) access network;
a Code Division Multiple Access (CDMA) access network;
a WiFi access point; or
a Public Switched Telephone Network (PSTN).

17. The computer device of claim 15, wherein, when identifying at least one of the available technology type to carry the SIP call from the originating device or the available technology type to carry the terminating SIP call to the terminating device includes:
  determining that the SIP call is originating or is to terminate in a provider network other than a provider network associated with the computer device; and
  accessing a provider network database to determine a technology type associated with the other provider network.

18. A system comprising:
  a first computer device configured to:
    detect a Session Initiation Protocol (SIP) call from an originating device;
    identify an available technology type to carry the SIP call from the originating device;
    incorporate information identifying the identified available technology type into the SIP call, before the SIP call is forwarded toward a destination; and
    store information relating to the SIP call, wherein the stored information includes the information identifying the identified available technology type; and
  a second computer device configured to:
    retrieve the stored information relating to the SIP call; and
    determine a number of SIP calls for particular technology types based on the retrieved information relating to a plurality of SIP calls that include the SIP call.

19. The system of claim 18, wherein the number of SIP calls for particular technology types includes at least two of:
  a number of Voice over Long Term Evolution (VoLTE) to VoLTE calls within a particular time period;
  a number of VoLTE to Code Division Multiple Access (CDMA) calls within the particular time period;
  a number of VoLTE to WiFi calls within the particular time period;
  a number of VoLTE to Public Switched Telephone Network (PSTN) calls within the particular time period; or
  a number of VoLTE to other carriers calls within the particular time period.

20. The system of claim 18, wherein the second computer device is further configured to:
  calculate, for a particular service area, a number of SIP calls with a selected technology type that is different than an available technology type;
  determine that the calculated number of SIP calls with the selected technology type that is different than the available technology type is greater than a threshold; and
  generate a service alarm, in response to determining that the calculated number of SIP calls with the selected technology type that is different than the available technology type is greater than the threshold.

* * * * *